(12) United States Patent
Bakewell

(10) Patent No.: US 7,262,790 B2
(45) Date of Patent: Aug. 28, 2007

(54) MOBILE ENFORCEMENT PLATFORM WITH AIMABLE VIOLATION IDENTIFICATION AND DOCUMENTATION SYSTEM FOR MULTIPLE TRAFFIC VIOLATION TYPES ACROSS ALL LANES IN MOVING TRAFFIC, GENERATING COMPOSITE DISPLAY IMAGES AND DATA TO SUPPORT CITATION GENERATION, HOMELAND SECURITY, AND MONITORING

(76) Inventor: Charles Adams Bakewell, 4913 Donovan Dr., Alexandria, VA (US) 22304

( * ) Notice: Subject to any disclaimer, the term of this patent is extended or adjusted under 35 U.S.C. 154(b) by 928 days.

(21) Appl. No.: 10/338,247

(22) Filed: Jan. 8, 2003

(65) Prior Publication Data

US 2003/0214585 A1 Nov. 20, 2003

Related U.S. Application Data

(60) Provisional application No. 60/347,080, filed on Jan. 9, 2002.

(51) Int. Cl.
H04N 7/18 (2006.01)
(52) U.S. Cl. ............... 348/148; 348/149; 348/143; 348/207; 340/936; 340/937; 701/117; 701/119
(58) Field of Classification Search ........... 348/148, 348/149, 143, 207; 701/117, 119; 340/936, 340/937
See application file for complete search history.

(56) References Cited

U.S. PATENT DOCUMENTS

| 5,111,289 | A | * | 5/1992 | Lucas et al. | ............... 348/148 |
| 5,948,038 | A | * | 9/1999 | Daly et al. | ............... 701/117 |
| 6,046,696 | A | * | 4/2000 | Blanco | ............... 342/171 |
| 6,690,294 | B1 | * | 2/2004 | Zierden | ............... 340/937 |

* cited by examiner

Primary Examiner—Shawn S. An

(57) ABSTRACT

A manned, mobile traffic enforcement platform with aimable violation detection and documentation devices, employing digital video and still images, incorporating contextual information as well as data input by the system operator and driver, with numerous commercial-off-the-shelf components and a physically integrated composite display. The mobile enforcement platform (MEP) is operated by trained system operators, typically sworn-officers, who apply pre-determined criteria, protocols, procedures and routines to generate conclusive, court-acceptable violation documentation. MEP supports detection, identification, and documentation of violations in any lane behind or in front of the moving MEP vehicle or from the roadside. MEP captures most types of moving violations, including aggressive driving, in readily retrievable documentation formatted for later mail citation and court use. MEP increases police and court productivity, reduces police officer paperwork and court time, increases enforcement credibility, reduces crash costs and fatalities, improves highway safety, and augments homeland security capabilities.

5 Claims, 12 Drawing Sheets

MOBILE ENFORCEMENT PLATFORM WITH AIMABLE
TRAFFIC VIOLATION DETECTION AND DOCUMENTATION SYSTEM
EMPLOYING COMPOSITE DISPLAY OF SCREENS AND DATA

FOOT-OPERATED, LATERAL POSITION-LOCK FOR MOVABLE
DETECTION AND VIOLATOR IDENTIFICATION EQUIPMENT ASSEMBLY

CONTROL FOR DETECTION ACTIVATION, LICENSE PLATE
VIDEO CAMERA, AND COMPOSITE, STILL IMAGING

SYSTEM OPERATOR'S TOUCHSCREEN DATA INPUT DEVICE

SYSTEM OPERATOR'S SCREEN DISPLAY

| GPS COORDS | DATE/TIME |
|---|---|
| LP ENTRY STATE/NUMBER | POSTED SPEED LIMIT |
| HIGHWAY/STREET TYPE/NAME OR NUMBER ||
| VIOLATION DETECTED ||
| SYSTEM OPERATOR NAME & VAN DRIVER NAME ||

MEP VEHICLE DRIVER'S TOUCHSCREEN DATA INPUT DEVICE

MEP VEHICLE DRIVER'S SCREEN DISPLAY

MOBILE ENFORCEMENT PLATFORM WITH AIMABLE VIOLATION IDENTIFICATION AND DOCUMENTATION SYSTEM FOR MULTIPLE TRAFFIC VIOLATION TYPES ACROSS ALL LANES IN MOVING TRAFFIC, GENERATING COMPOSITE DISPLAY IMAGES AND DATA TO SUPPORT CITATION GENERATION, HOMELAND SECURITY, AND MONITORING

CROSS-REFERENCE TO RELATED APPLICATIONS

Provisional Patent Application No. 60/347,080; filed Jan. 9, 2002

Non-Provisional Utility patent application Ser. No. 10/161,942, and its Provisional Patent Application No. 60/295,887

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The disclosed invention relates generally to mobile, integrated systems for highway traffic violation enforcement, and more specifically to a system modularly installed in a vehicle (together constituting a Mobile Enforcement Platform or MEP) for acquiring, integrating, displaying, archiving, and transmitting or downloading images and data that document multiple types of moving traffic violations as identified and determined by the trained and authorized MEP operator (generally assumed to be a police officer) from multiple lanes of moving vehicles while MEP, itself, is either moving or stationary. MEP enhances and automates the violation documentation process, which feeds into a citation-by-mail process, reducing police officer paperwork and the court-time per citation issued. MEP's capabilities also are suitable for certain mobile monitoring and documentation requirements supporting homeland security programs, objectives, and activities as well as other surveillance requirements.

Traffic violation enforcement typically has been and is an increasingly costly, inefficient, labor-intensive, labor-limited, and frequently ineffective process. Limited police resources are assigned across numerous competing duties and priorities, leaving relatively few police personnel for traffic enforcement where violators greatly outnumber the sparsely distributed enforcers.

Over the years, devices have been introduced to improve the detection, documentation, and prosecution of traffic violations. The use of radar and laser devices to detect and record vehicle speed began in the 1950s, first with fixed, manned systems at the roadside or in makeshift tower structures erected in the median. Later, the speed detection device was mounted on the police vehicle, initially for stationary use and subsequently for mobile use, permitting detection and pursuit by the same officer. Video cameras were introduced to capture sequential images to document violations and the apprehension/citation process, both to support the prosecution of the accused and to provide evidence in the event of legal counter-proceedings by the accused against the accusing officer. Computers were installed in police vehicles to improve the data access, communications capabilities, and integrated teamwork and use of mobile, field, and station personnel and equipment. However, all the devices and processes still required that an officer would identify, stop, detain, and process each violator sequentially, clearly establishing an upper limit on an officer's productivity.

Most recently, unmanned, fixed systems for detection and documentation of speeding and red-light running have been installed to monitor all traffic continuously and to generate and store the necessary composite visual and digital data imagery to support traffic violation citation processes. These devices develop documentary evidence, which is processed later by police, government, or private contractor personnel, producing citations, which are mailed to the registered owner(s) of the cited vehicle based on the associated license plate and vehicle images.

Global positioning satellite system data can be acquired and displayed via a monitor to show the map coordinates for the approximate location of the acquiring receiver and display monitor, essentially replacing the old LORAN system aid to navigation with a modern, more useful system. This technology has had little application in traffic enforcement because either the officer writes the approximate location on the citation or the detection and documentation device is at a fixed, known location.

BRIEF SUMMARY OF THE INVENTION

The disclosed system and methods are controlled and operated by a trained, authorized person in a vehicle operated by a trained, authorized driver. The driver's task is to drive the vehicle according to prevailing regulations and posted traffic signs along a pre-planned route. The system operator operates the entire enforcement system through mechanical and electronic means to identify a violator and the violation, enter the violation specifics, and then acquire, integrate, capture, archive, and transfer violation documentation (continuous and still) images and data as well as other traffic and vehicle information of customary interest to police and highway department personnel and their various missions.

The invention generally consists of integrated detection and imaging systems installed on a custom manufactured frame around a central work area from which a trained and authorized person operates the equipment to initiate and generate the violation documentation and other vehicle data that are central objectives of the invention. The invention can detect and document a variety of developing violations simultaneously in multiple lanes of traffic behind and in front of the MEP vehicle. The invention's capabilities dramatically increase the scope and credibility of traffic enforcement, which in turn will make the highways safer. Now, instead of telling it to the judge, an officer can show the violation to the judge and violator. MEP's comprehensive documentation of each violation charged eventually should reduce the cases contested, freeing up police officer and court time for other priorities.

The integrated detection and imaging units (one viewing traffic to the rear and/or one viewing traffic to the front of the MEP vehicle) consist of two high-resolution digital video cameras and a speed detection device (radar or laser) co-mounted on a single arm, which is mechanically or hydraulically aimed and operated by the MEP system operator. (Alternatively, the speed detection device may be co-mounted in fixed-aim position with the aft-facing and forward-facing fixed video cameras.) The operator points the arm and unit toward the potential violator, zooms on the license plate (and perhaps on the vehicle and driver) with the digital video camera(s), enters certain digitized information such as the license plate data and violation observed, and triggers the speed detection device. The cameras and speed detection device generate images and data, which are displayed together with other information for continuous videotaping and still-imaging on operator command.

Additional displayed information in the composite display include: the location coordinates displayed by a global positioning system receiver, the location description, and the posted speed limit and work zone status input by the driver. Other information displayed from the processing personal computer includes the driver's name and identifying number, the MEP operator's name and identifying number, and the date and time continuously updated.

The MEP operator has an alphanumeric touchscreen device for entry of the violation type and the violator's license plate number and state of registration to digitize the plate data immediately. Where permissible under prevailing laws and procedures, the positive license plate identification instead may be voice-recorded on the continuous video to facilitate documentation of high volumes of violations. Either process avoids the usual errors of optical character recognition, especially for widely varying character formats and can make the license information available for records management and for immediate law enforcement use. When the MEP operator is satisfied that the display is complete and correct (the digitized license plate data is an optional requirement here), the operator presses a trigger button on the handle of the combination detection and camera unit aiming device or on the touchscreen to capture a high resolution digital, still image of all the composite display's screens and displays. The operator may continue to track the violator and trigger and capture a second composite image some pre-set number of seconds after the first image (if this is required by the jurisdiction).

The captured composite still images are saved directly to an image storage device in the camera or a second high speed personal computer for 1) retention for later download and processing, 2) digitized license plate transmission with location, date, and time, and 3) high-speed radio transmission or land-line transfer of still images to a fixed site for immediate citation processing.

The composite display is continuously taped with a fixed digital video camera. A high-resolution camera co-mounted with the fixed video camera captures the digital still images. This video camera is the only one to save continuous images on tape or CD. The tapes or CDs and the still images are labeled and archived for data retrieval, as necessary. A unique identifying number combining the date and time and MEP unit identifies specific tapes or CDs. Still images are identified by the same identifying combination of information used for the video images for the moment the image is captured on the particular videotape together with the digitized license plate data, if entered. This correspondence facilitates rapid retrieval of video segments containing sequences that relate to respective still images.

A second comparable system may face the front of the MEP vehicle to permit identification and documentation of violations by vehicles without a front license plate as well as violations that occur in front of the MEP vehicle. The forward-facing system's equipment, capabilities, data capture, operation, and information display are the same as for the rear-facing system except that the violator's face cannot be captured.

All of the equipment together with the operator's seat are mounted on a strong, lightweight metal frame that is fastened to the vehicle floor in the space bounded by the backs of the driver's and front passenger's seats, the interior side-panels and rear wheel wells, and the rear door (through which the entire assembly is modularly installed and removed.

All equipment and the operator's seat are commercially available with the required specifications. However, the invention integrates the equipment and its operational flexibility to provide an innovative mobile traffic enforcement tool that has the potential to improve enforcement productivity and credibility by a factor of 100 times in many traffic settings. The invention also replaces some police officer paperwork with automated composites, which are the basis for issuance of a citation by mail.

The vehicle and its equipment will be checked at regular intervals including the start and end of each operating day or shift according to user agency procedures to ensure that the entire system is performing properly and that calibrations critical to violation measurement and adjudication are correct (and therefore indisputable) before and after each MEP operations interval. A zero defect citation process is achievable with the invention, enhancing its credibility and constructive impact on traffic safety.

DETAILED DESCRIPTION OF THE INVENTION

Figure 1:
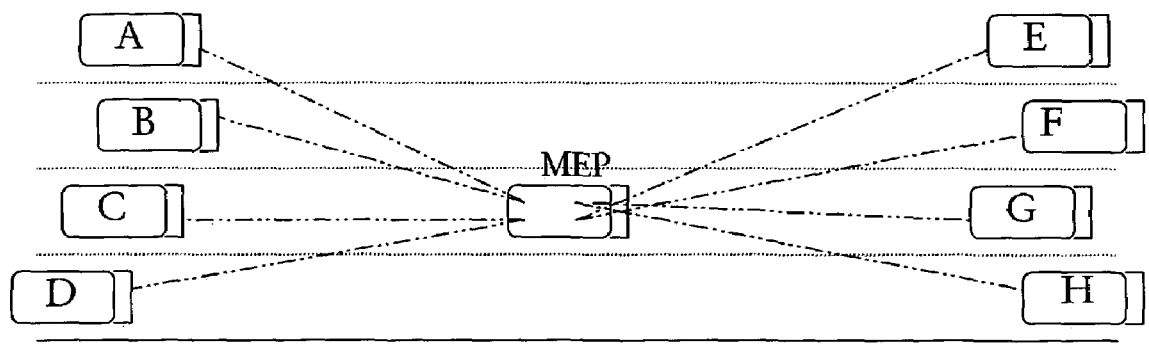
FIG. 1 shows the flexibility of the Mobile Enforcement Platform's Aimable Traffic Violation Detection and Documentation System

FIG. 1 is an overview showing the Mobile Enforcement Platform (MEP) in a multi-lane highway setting in the midst of traffic flowing from left to right. Although the invention is intended to support identification and documentation of traffic violations by vehicles driving in the same direction as the MEP vehicle, MEP can be used in a stationary mode detecting and documenting violations by either oncoming or overtaking vehicles. MEP's violation identification and documentation system is aimable so that the onboard operator can point it at a vehicle in any parallel lane as well as MEP's own lane. This flexibility overcomes the limitations of previous onboard systems which are fixed-aim, driver-operated (no second officer present to focus entirely on violation identification and documentation), and generally support the one-to-one police enforcement approach that greatly limits the effectiveness of current traffic enforcement.

As illustrated, the aimable equipment, which is situated to operate non-stop toward the cars behind and in front of MEP, which is in motion, can be aimed sequentially at a target vehicle in any of several lanes. MEP is designed to develop the necessary information and violation documentation to support citation-by-mail, greatly increasing the productivity of traffic officers and increasing the proportion of violators being identified and cited. MEP also will reduce police officer paperwork and court time for the average violation.

MEP is designed for identification and complete documentation of many types of moving violations, especially where it is too dangerous to attempt a traffic stop or where violations are too rapid and numerous for traditional traffic enforcement to be effective, including:

Failing to yield right-of-way
Following too closely
Unsafe lane changes
Improper passing
Speeding
Disobeying traffic signals (including stop signs)
Reckless driving The system also is designed to support homeland security surveillance activities and highway use information needs for planning. The potential crash reduction, public health, and economic benefits are very large.

One set of speed detection and digital image violation documentation equipment faces the rear window of a van-type vehicle and/or another duplicate set faces the front window. The units are operated by a trained person (generally a police officer trained and experienced in traffic enforcement) seated in a chair installed in the middle of the removable MEP frame.

Figure 2:
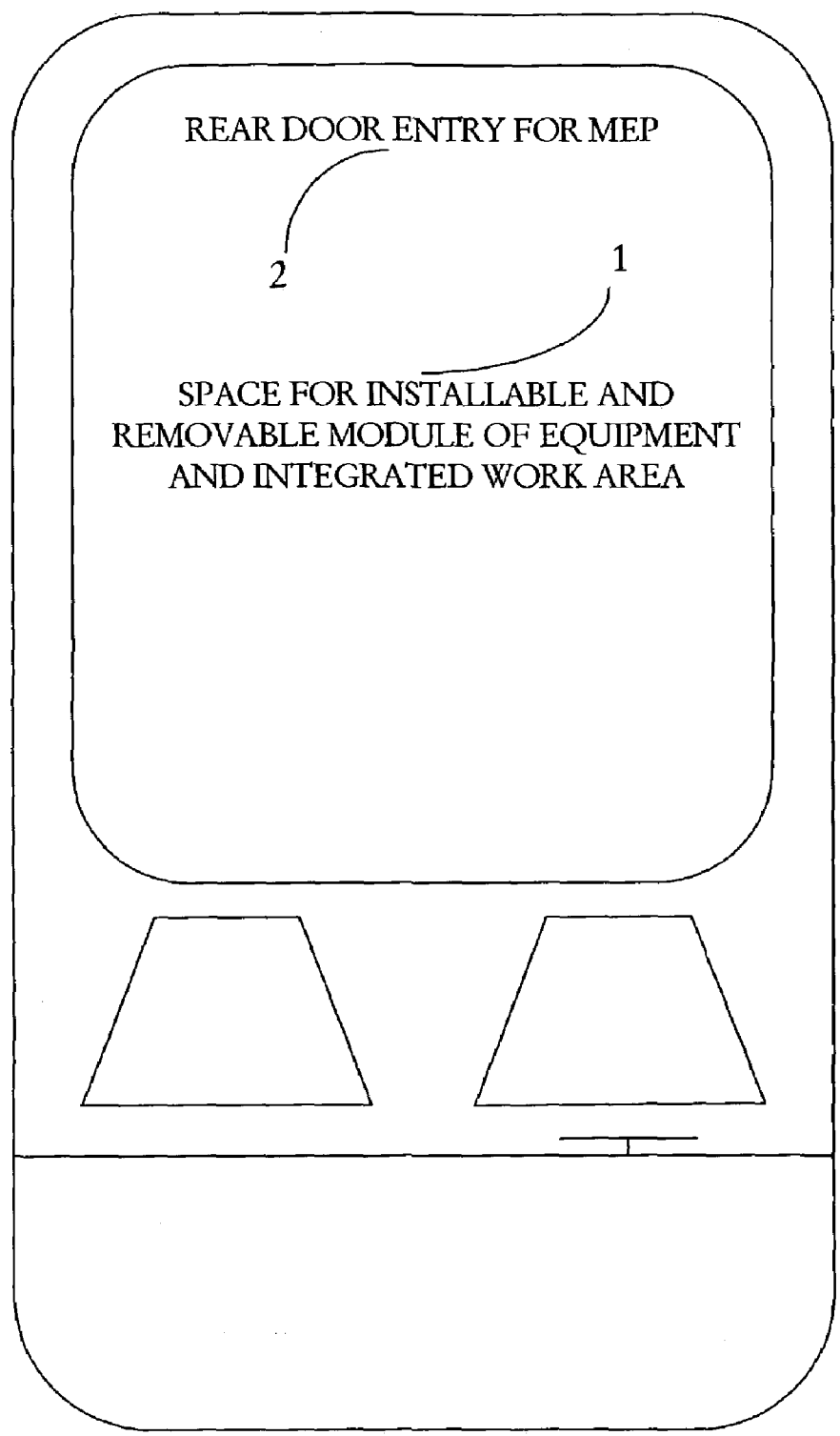
FIG. 2 shows the space in a generic van-type vehicle where the Mobile Enforcement Platform frame-mounted module would be installed and removed through the rear doorway.

FIG. 2 shows the overview of the MEP vehicle with back seats removed to make space 1 for the MEP installable and removable module of equipment and integrated operator work area. The module is installed and removed through the rear door 2 of the van-type vehicle. Other vehicle-types may be used such as panel trucks or campers or recreational vehicles, the primary requirement being that the vehicle have a rear entrance and internal space, both sufficient to accommodate the complete module and workspace required. This vehicle flexibility is intended to give the police greater latitude in (a) purchasing vehicles through current contracts and vendors, (b) selecting a vehicle offered by their preferred manufacturer, and (c) choosing the vehicle which will blend in best in the local traffic.

Figure 3:
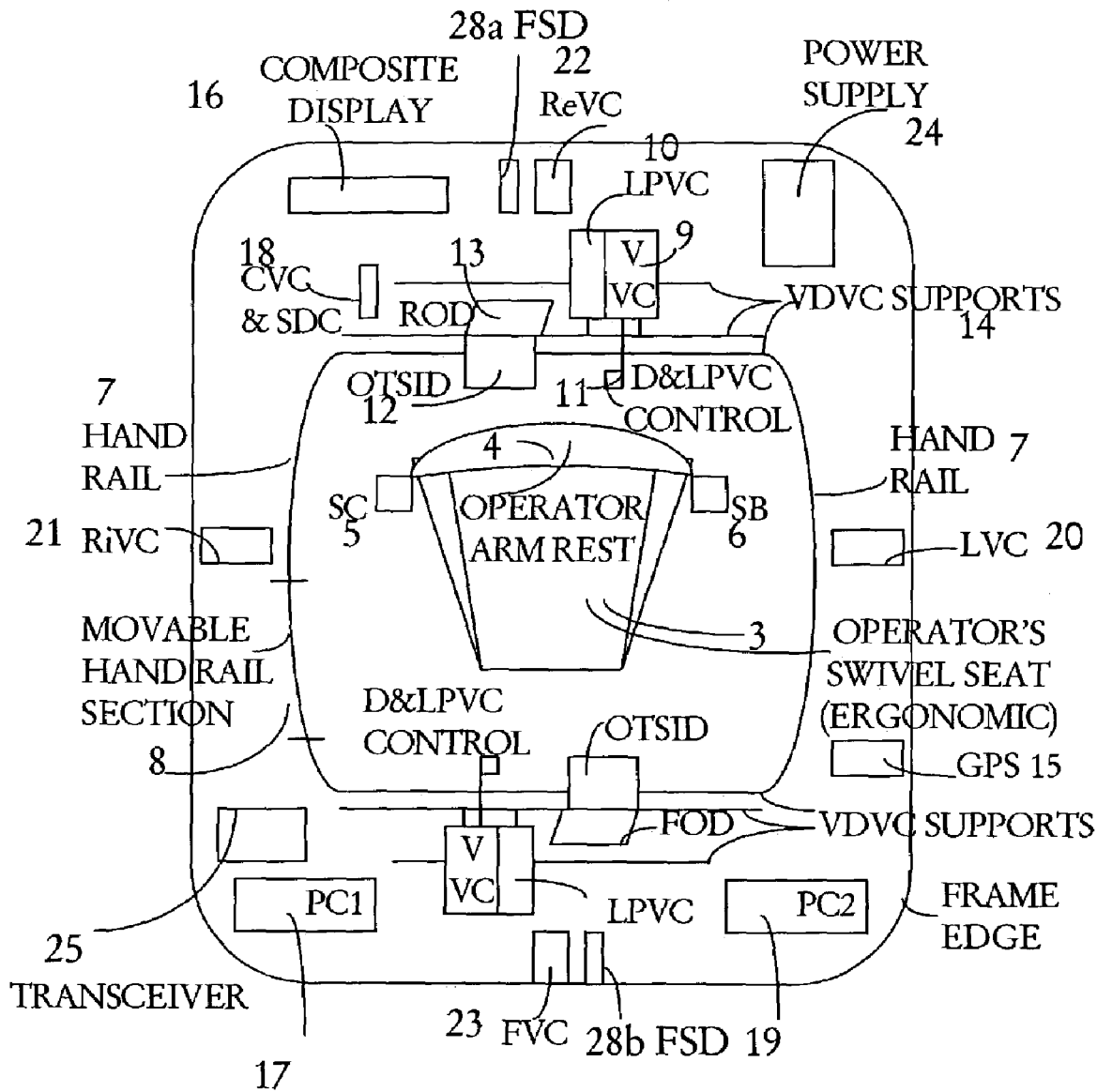
FIG. 3 shows the equipment and workspace configuration of the frame-mounted, removable platform module.

FIG. 3 shows the equipment elements and their configuration with the workspace on the frame-mounted, removable platform. This description starts with the operator's work area, then describes the elements and operation of the rearward detection and documentation equipment operated by the operator, then describes the remaining equipment and documentation operations.

The operator enters the work area through an opening in the handrail 7 that surrounds the work area of the module. The opening is opened by temporarily removing a movable piece 8 of the handrail. The operator sits in an ergonomic operator's seat or captain's chair 3 that is attached to the center of the module frame and swivels 360 degrees in either direction for operating access to all equipment, in particular the speed detection and documentation equipment, input devices, and system controls facing the rear and/or the front. The seat 3 has restraining safety straps fully equivalent to approved seat belt and shoulder strap for any highway vehicle. The seat 3 has an armrest 4 across the front of the seat to support the operator's arms to reduce fatigue and stress during operation. The seat controls 5 allow the operator to adjust the chair height and angle (fore and aft) as well as the contour of the back, all for the operator's maximum comfort. Such seats, captain's chairs, and seat controls are readily available in various models of automobiles and vans sold in the United States. The seat 3 also has a seat brake 6 so the operator can lock the chair in position suitable for the current activity, be it using the rearward devices or the frontward devices or stopping while facing some intermediate side position.

There are matching sets of speed detection and video documentation equipment facing the rear and the front of the MEP for use as illustrated previously in FIG. 1. The difference between the two sets is that the front system captures the rear of vehicles ahead of the MEP while the rearward system captures the front and driver of the vehicles it views. The frontward system cannot capture the driver's face, but is not subject to photographic interference from bright headlights and can capture license plates on cars that have no front license plate.

Using the rearward equipment for illustration, the operator's main devices for violation identification and documentation of traffic violations are the violator video camera 9 (captures the violating vehicle and driver), the speed detection device (which is obscured under the violator video camera 9 in this figure, the license plate video camera 10 which is focused on and captures the license plate image close-up, the control unit 11 for the video cameras 9 and 10 and the speed detection device (e.g., RADAR or laser LIDAR) under 9 (or alternatively co-mounted 28*a* and 28*b* with the rear-facing and front-facing fixed-aim video cameras), the operator's touchscreen or keyboard input device 12 and the rear operator's display 13; 12, and 13 are shown to the left of 9, 10, and 11, but can be flip-flopped to the right for the convenience and comfort of the operator; this also can accommodate right- and left-handedness.

The violating vehicle video camera 9 captures the full front of the violating vehicle and the driver in color digital imagery, providing clear identification of the make, model, and color of the target vehicle. Depending upon lighting conditions and windshield tinting, the camera also will capture the driver's face or silhouette, which will help identify and document the violating driver. If the violation involves speeding, the speed detection device below the camera 9 generates the target vehicle and MEP speed information, which is the partial basis for determination whether a violation has occurred. Alternatively (or in addition), the MEP speed data may be fed to the composite digital display and the integrating personal computer 17 from the MEP vehicle's certified calibrated digital speedometer.

The license plate video camera 10 is zoomed by the operator to fill the license plate window on the operator's display screen 13 with the license plate image and on the camera's own display panel.

In order to capture the license plate, vehicle, and driver images and to capture the target vehicle's relative speed (relative to MEP or alternatively to fixed objects such as trees and bridges), the operator aims the co-mounted video cameras 9 and 10 and the speed detection device by moving the control handle 11 arm horizontally and vertically. The camera 9 is mounted directly over the speed detection device to ensure that the two devices are aimed at the same vehicle in a common vertical plane. Camera 9 is mounted to the right of the license plate video camera 10 since the license plate will typically be to the left of the driver.

The operator uses the images from cameras 9 and 10 and 18, and the operator's display 13 as well as the speed detection information to determine whether there is a speed violation or other violation and whether the desired images are being captured.

Simultaneously, the operator enters information on the touchscreen or keyboard input device 12 for immediate availability of digitized license plate information and the violation detected (e.g., speeding, reckless driving, aggressive driving, failure to stop for a red light, failure to stop for a stop sign, or other violations that particularly concern the jurisdiction).

Optionally, the detection device, cameras 9 and 10, touchscreen input device 12, and operator's display 13 may move laterally as a unit on horizontal bars 14 that support them. This allows the operator to get a better angle or to get closer to a head-on angle or simply to change positions in the course of a work period.

The speed detection device output (and certified calibrated speedometer data) and the images from cameras 9 and 10 are fed to the composite display 16. Other information is fed to the composite display from the operator's touchscreen input device 12, the global position system device 15 (continuous feed of coordinates of approximate location), and the MEP vehicle driver's touchscreen data input device described later in FIG. 12.

Figure 9:
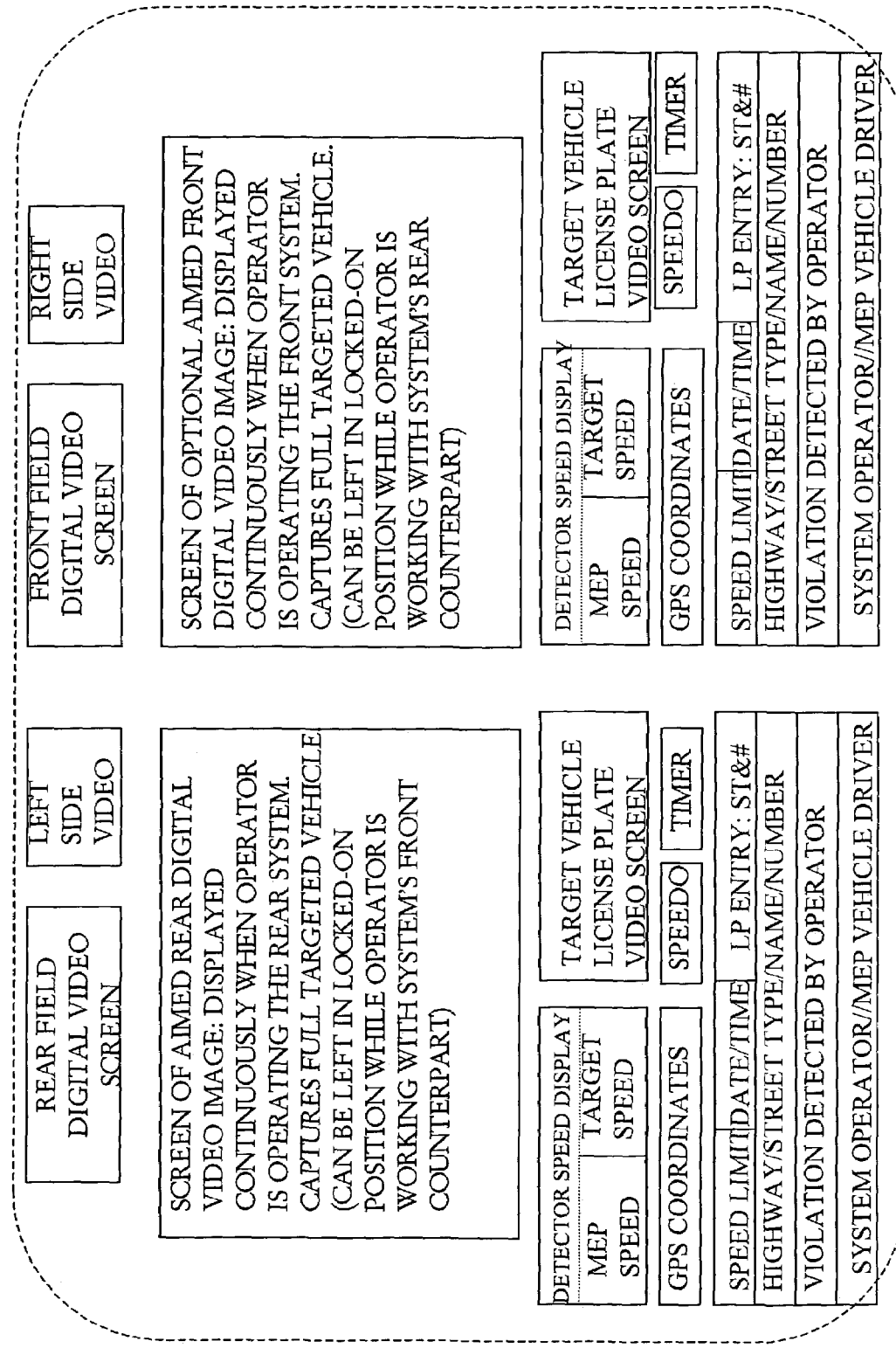
FIG. 9 shows the elements displayed together in composite for continuous digital videotaping and digital still image capture.

The entire composite display 16 with elements, which will be described in detail in FIG. 9, is continuously captured by digital video camera 18. The video images are clearly and continuously identifiable as to date, time, location, operator, and driver, and with these markings are readily available for copying as evidence or viewing for moving violation citation processing where the violation is not established or confirmed simply by viewing a single digital composite image that shows a vehicle speed clearly over the speed limit.

A separate still digital image of the composite display 16 will be taken by a digital camera mounted just under the video camera 18. The still image is output directly to its camera's image storage device or to a high-speed personal computer 19 for storage and later transmission or download for citation processing.

The citation processor uses each violation still image as the basis for a citation and will report on the disposition of each violation identification. License plate images are the primary source for identification of violating vehicle ownership, and the operator inputs (manual or voice) are first and foremost the positive indication of intent to cite. Citations are processed and addressed to the registrant(s) of record for the violating vehicle in speeding violations, provided the vehicle description in the registration data is consistent with the vehicle image. Otherwise, the violation likely will be referred to other authorities.

Non-speeding violations may not be able to be processed on the basis of a single frame digital image, depending upon the training and police authorization of the MEP operator. If the MEP operator does not have sufficient authority to generate the citation, then review of the videotape or CD from camera 18 provides the necessary additional information for an authorized person to issue the citation, if warranted. The date and time on the still image provide the necessary cross-reference for the reviewer to rapidly find and review the relevant sections of videotape or CD.

In order for the digital images to be credible proof of violation, the speed detection device will need to be checked for calibration at the beginning and end of each shift and as recommended by the manufacturer after the jurisdiction discusses the intended use with the manufacturer. The calibration activity itself may be included on the videotape as evidence that it occurred as required.

The speed detection device, video cameras 9, 10, and 18, the GPS device 15, and the composite display elements 16, and the PC1 17 and PC2 19 all are readily available from numerous commercial sources. The video cameras must produce high-resolution digital images capable of communicating all imagery and alphanumeric detail sufficiently clearly for legal proceedings. An example of the digital video cameras could be the Panasonic PV-DV950, which provides adequate image resolution and the necessary electronic image stabilization capability. However, only the video camera 18 records its images on videotape or CD. All other digital video cameras in the invention output video to separate monitors, requiring the PV-DV950's docking station direct video output. All equipment must be capable of sustained, heavy use and is placed in readily accessible space so that it is easy to remove and replace any piece of equipment that is not performing correctly.

Additional digital video images are provided on a continuous basis from fixed cameras 23, 21, 22, and 20, respectively at 0 degrees, 90 degrees, 180 degrees, and 270 degrees (90 and 270 are optional). These additional images are direct output from the video cameras and provide a continuous context in, the composite display 16 for the violation images and facilitate continuity of imaging as a vehicle passes from the rearward view to the frontward view or from front view to the back. As indicated above, the speed detection devices may be fixed-aimed and co-mounted with video cameras 22 and 23.

The power supply 24 for the computers, monitors, and other electrical equipment is located on the frame. However, in some climates and seasons, it may be necessary to have air conditioning and fans for the equipment and work area. In this case, generator and air conditioning equipment beyond the vehicle's capabilities may be placed on the roof of the vehicle.

The image and data transceiver 25 supports remotely activated transmission of license plate, date, time, and location data as well as selected violation images ready for processing. All these data are stored on the high-speed personal computer 19 for transmission on demand or for later download via landline or at a fixed facility. Every license plate entered by the operator is saved automatically to the personal computer 19 along with the respective date, time, GPS location, and MEP driver entered street-type—and highway name or number. These data are useful to law enforcement agencies and officers as well as to highway departments and planners.

Figure 4:
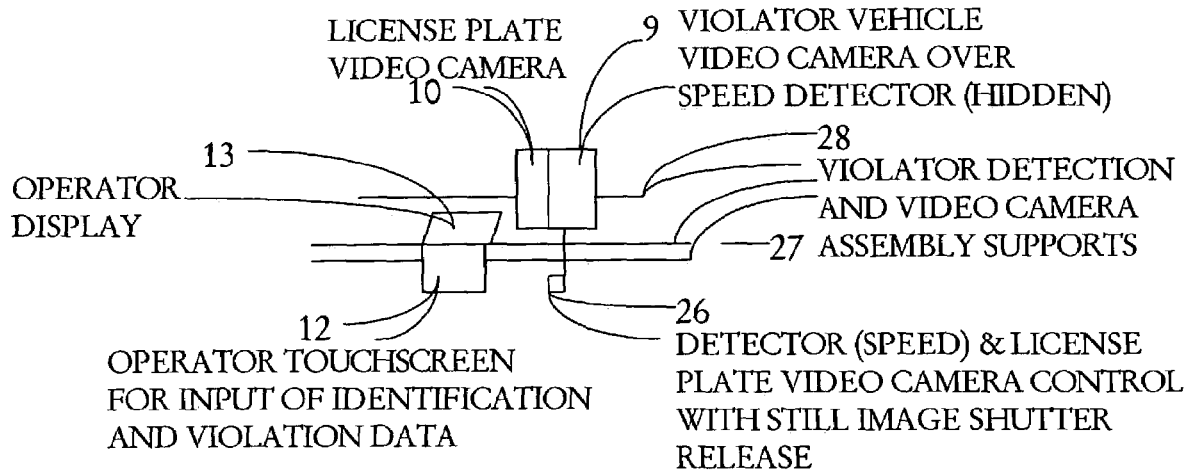
FIG. 4 shows the view from above of the Mobile Enforcement Platform operator's aimable equipment for detecting speed and identifying and capturing traffic violations for documentation.

FIG. 4 shows a view from above the system operator's equipment for detecting speed and capturing traffic violations. The operator observes traffic behavior either directly through the rear window or front windshield or virtually through the operator's display 13 and viewing screens of cameras 9 and 10 showing images of traffic to the rear or in front. When the operator determines that a violation is occurring, the operator aims the speed detector and vehicle and license plate cameras 9 and 10 at the targeted vehicle. If in the judgment of the operator a violation other than speeding is being or has been captured on the continuous digital video (display 16 and video camera 18), the operator will obtain the best still image considering distance and relative speed of the vehicle and MEP for later use in identifying the violation on tape for review and citation. The operator may ask MEP's driver to slow a bit to allow the violator to approach, permitting a better image of the license plate, vehicle, and driver.

For suspected speeding, the operator will aim the speed detector and two video cameras 9 and 10 at the targeted vehicle and acquire the target speed data and images for determination of whether a violation has occurred and, if so, for tracking of the vehicle until the desired images of the license plate and vehicle/driver are achieved, permitting a still digital image of the respective composite display 16, using the still digital camera paired with the digital video camera 18.

Figure 5:
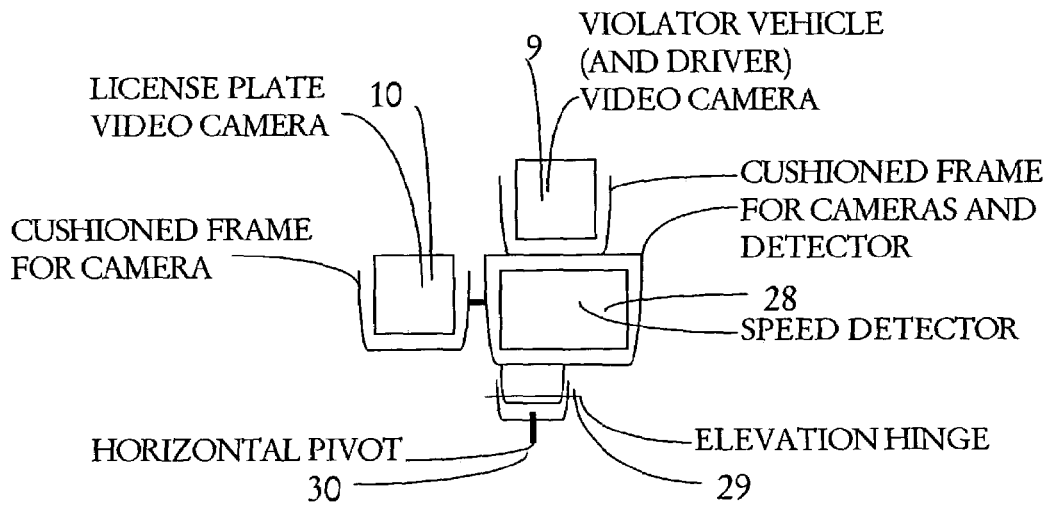
FIG. 5 shows the operator's view of the violation identification and image capture system elements in their mounts and the system hinge and pivot for aiming.

FIG. 5 shows the operator's view of the configuration of the violation identification and image capture elements. The violator vehicle (and driver) digital video camera 9 is set into a padded frame over the speed detector 28, which also is set into a padded frame. To the left of the speed detector 28 is the license plate digital video camera 10 also set into a padded frame. The license plate video camera 10 is attached to the main assembly by a stiff rotation joint to permit adjustment of its orientation to a preferred elevation from which its elevation for license capture can be fine-tuned as will be discussed in relation to FIG. 8. The viewing screens of both cameras 9 and 10 are opened facing the operator, facilitating system operation. In each instance, the padding is to reduce the jarring effects of bumps in the road on the sensitive equipment and the quality of the video and still digital images. All video cameras have image stabilization to further dampen the effects of roadbumps on images. The elevation hinge 29 permits adjustment of the vertical alignment and the horizontal pivot 30 permits horizontal aiming—together providing the necessary degrees of motion to facilitate the desired aiming of the detection and image capture system.

Figure 6:
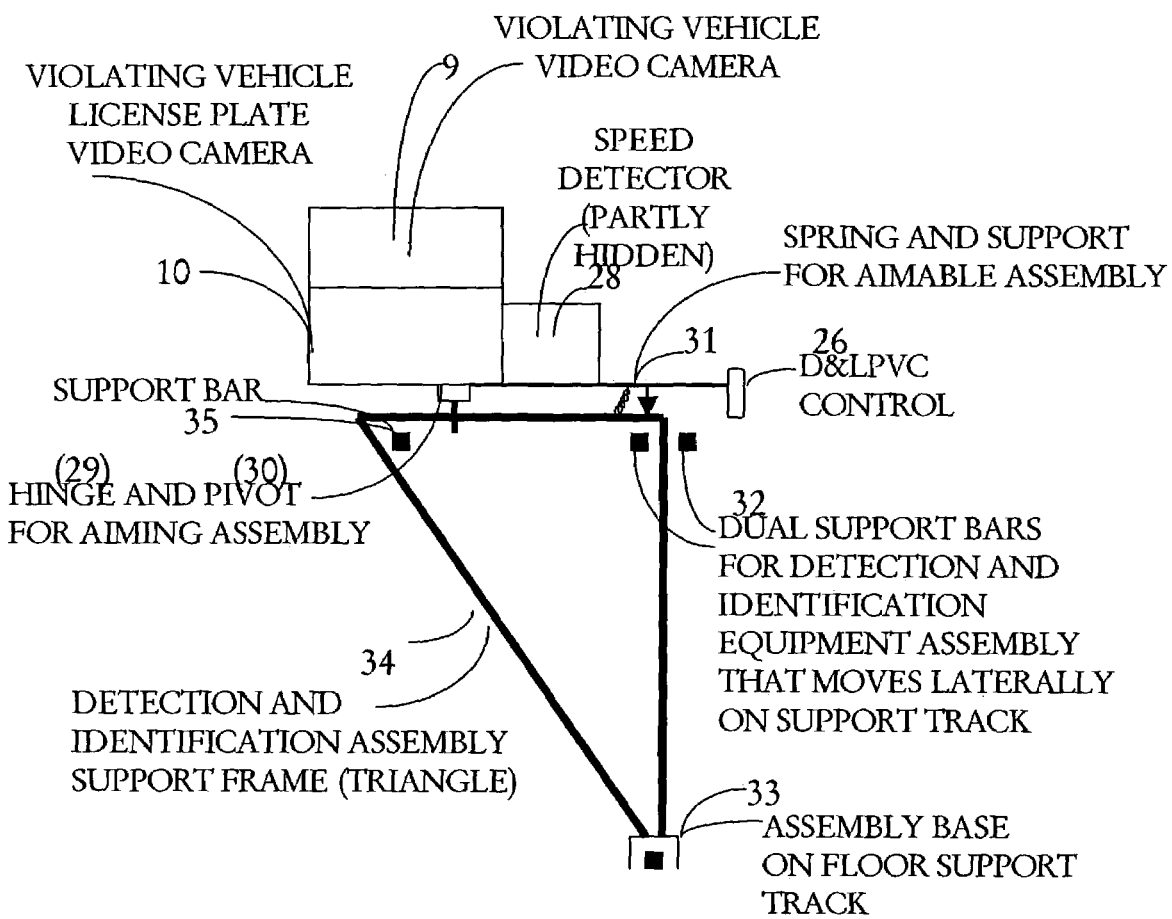
FIG. 6 shows the aimable, speed detector and video camera assembly (also optionally movable laterally) on its assembly support frame and optional carriage. Where required, the speed detection device may instead be co-mounted as fixed-aim units with the fixed-aim fore and aft video cameras.

FIG. 6 shows a view of the left side of the movable, aimable, speed detector and video camera assembly mounted on its assembly support frame and carriage. The vehicle video camera 9 is above the partially obscured speed detector 28 with the violating vehicle license plate video camera 10 between the viewer and the speed detector. The license plate camera 10 is portrayed in parallel alignment with the speed detector. The aimable set of speed detection and imaging equipment is presented in its neutral position resting on its support, reflecting the action of the light spring to draw the system back to center alignment which facilitates unmanned, straight-back monitoring of traffic behavior when not otherwise aimed by the operator. The speed detection and license plate video camera control 26 will be discussed in detail in relation to FIG. 8. The detection and camera assembly is mounted with a hinge 29 and pivot 30 to the assembly frame 34, permitting aiming from side to side with adjustment of the elevation below the resting position. An adjustment wheel-nut permits the operator to set the resting elevation of the assembly. The assembly frame is supported by three bars 32 and 35 and a track under the assembly frame base 33. The support bars 32 and 35 and the floor support track under the sliding assembly base 33 are fixed to the MEP frame referenced in FIGS. 14 and 15.

Figure 7:
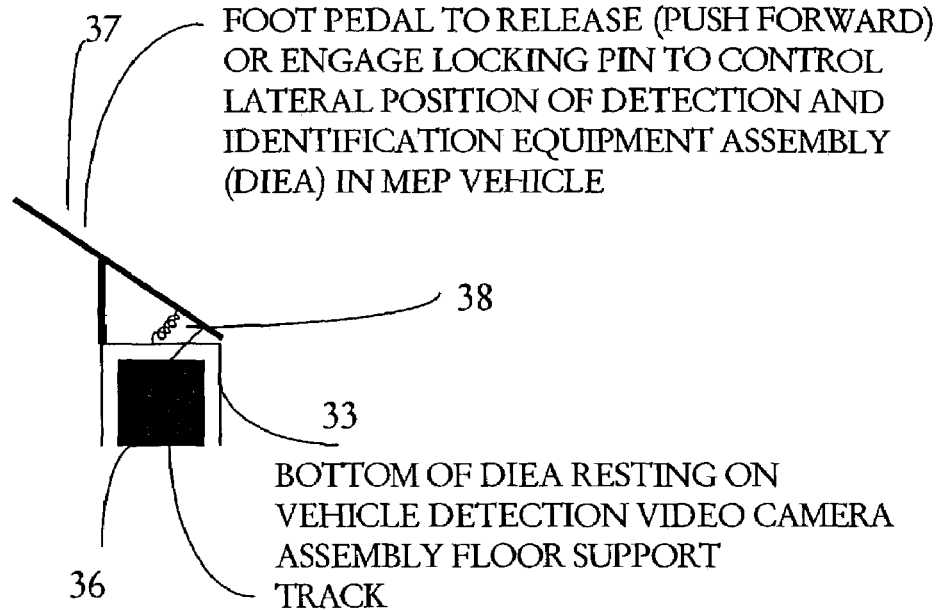
FIG. 7 shows the optional foot-operated, lateral position-lock for the movable speed detection and violator identification equipment assembly.

Optionally, the assembly and frame described in FIG. 6 may be moved laterally by the system operator as previously described. In order to move the frame and assembly, the operator must disengage the locking pin and, when the assembly reaches the desired position, reengage the locking pin. FIG. 7 shows the optional foot-operated, lateral position-lock for the movable detection and violator identification equipment assembly. The position-lock sits atop the assembly base 33, which rests on the floor support track 36. A spring 38 pulls a pin down into the floor support track unless the pin is pulled up by the operator pressing on the top of the pedal 37 with a foot, which through lever action pulls the pin away from the track. The track 36 has perpendicular notches along the top surface, which permit the pin to set itself, preventing the assembly from sliding to one side or the other.

Figure 8:
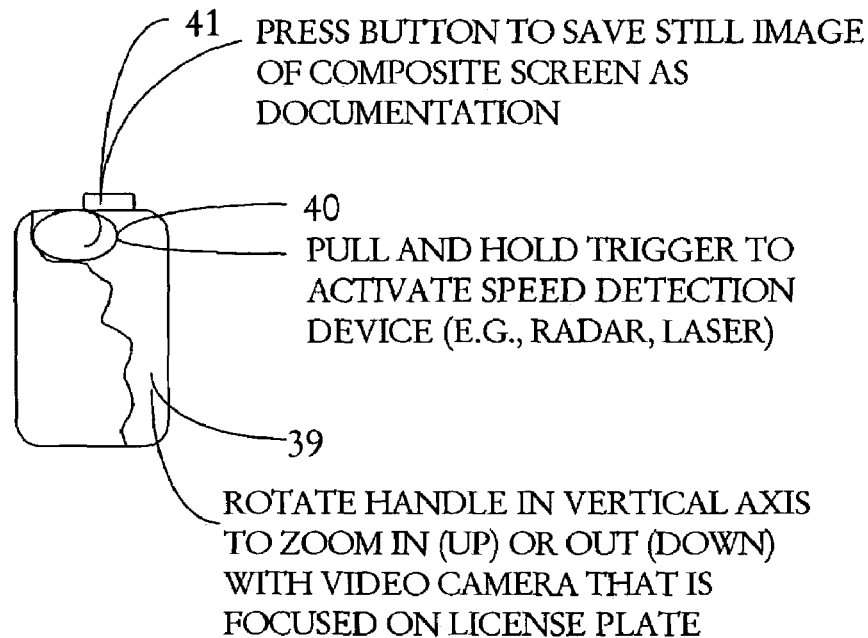
FIG. 8 shows the operator's control for speed detection activation, license plate video camera zoom, and triggering the composite still image-taking for violation documentation.

FIG. 8 shows the control for activation of speed detection and license plate video camera and composite still imaging. After the operator aims the detection and camera assembly, the license plate camera likely will need to be zoomed in or out from its last position to capture the license plate of the target vehicle in the full field of its respective display window on the operator's display 13 in FIGS. 3, 4, and later in FIG. 11, and on the respective screen in the composite display 16. Rotation of the handle in the vertical axis to zoom in (raising the wrist) or out (lowering the wrist) with the video camera focused on the license plate accomplishes this task. Pulling and holding the trigger activates the speed detection device (e.g., radar, laser). If a violation is detected and the camera images 9 and 10 are ready, then pressing the button 41 at the top of the handle takes a still digital image of the composite display 16 as documentation of the violation. Even if speeding is not charged but some other violation is, the operator may choose to include the speed measurement in the documentation for completeness and objectivity.

FIG. 9 shows the layout of the composite display (16 in FIG. 3) for continuous digital videotaping and still image capture. Across the top of the display, continuous images are displayed on separate 5" screens from the video cameras 20, 21, 22, and 23 identified in FIG. 3. On the left half of the display and below the rear field digital video image from camera 22, images and data pertaining to a rearward target are displayed. The largest image on a video screen (at least 13") is from the target vehicle and driver video camera 9 in FIG. 3. Below the image are 13 data elements: a MEP/target vehicle speed display connected to the speed detection unit, a GPS display of coordinates, a display of the target license plate video image, the MEP vehicle speed from the vehicle speedometer, the violator tracking time from the operator's computer, and a computer monitor displaying 6 data elements some of which are automated inputs and the rest of which are inputs from either the system operator or the MEP vehicle driver. The MEP speed and the target vehicle speed are measured and displayed by the speed detection device 28 in FIG. 5 or by the alternative fixed-aim speed detector co-located with the video cameras 22 and 23. The posted speed limit is entered by the MEP vehicle driver as will be discussed with FIG. 12. The target license plate is captured by zoomed video camera 10. Separately and time permitting, the system operator enters the license plate through a touchscreen which will be discussed in relation to FIG. 10. An alternative is the use of voice-recognition software so the MEP operator can speak the license plate state and characters for computerized insertion. Yet another alternative is to combine manual entry of a voice track pointer with continuously recorded voice track on the system videotape, which captures "live" driver and operator narratives in which the violator's license plate number is spoken. Since the system operator's entry of the license plate provides an immediate digitized identifier, a subsequent still image is identified by the license plate number as well as the date and time and location. If the vehicle is traveling too fast to permit touchscreen entry of the license plate, then the digitized license plate field will be blank and the date, time and location will be the only identifiers for the vehicle and image until a processor views the image, determines the license plate state and characters, and enters same to complete the data link in a separate database. The GPS location is generated by the GPS device 15, which is part of the composite display 16 and is used in conjunction with the highway or street information entered by the MEP vehicle driver from the input device to be described in FIG. 12. The violation detected or identified by the operator is entered by the system operator through the input device in FIG. 10. Lastly, the names or identifiers of the system operator and the MEP van driver are displayed in the bottom space. The optional right-hand half of the composite monitor display covers the same information but for the forward-facing detection and imaging assembly.

Figures 10, 11:
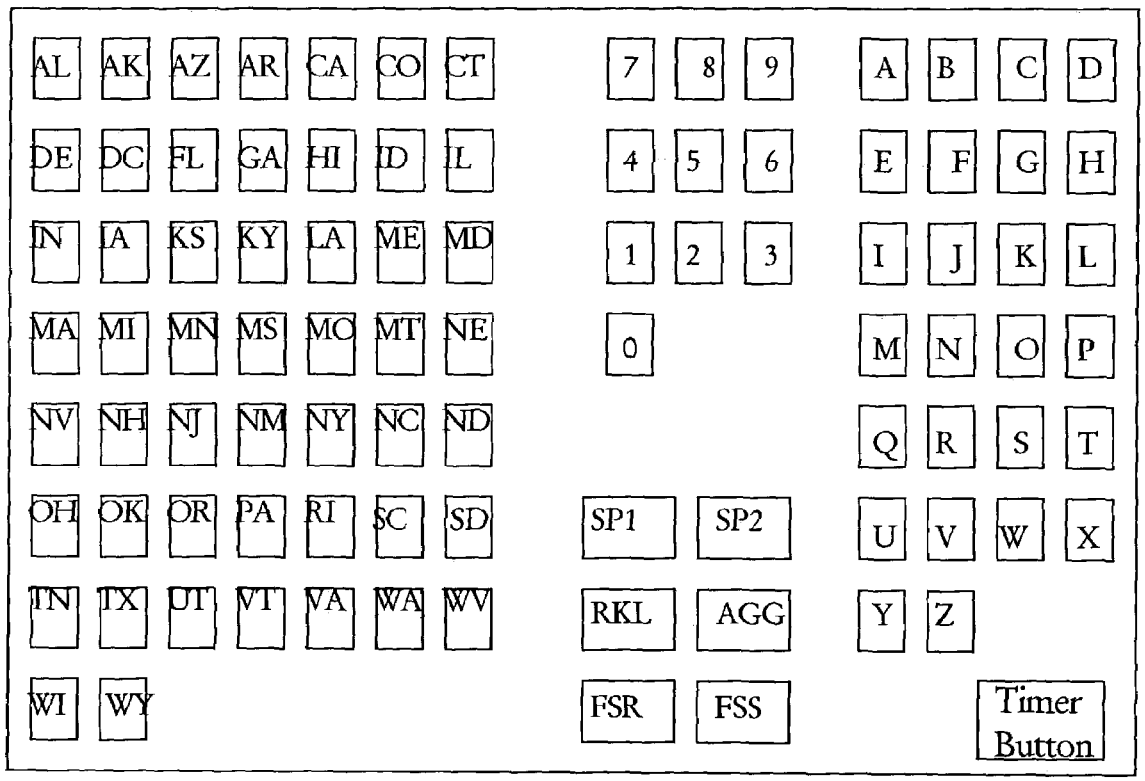
FIG. 10 shows the system operator's touchscreen or keyboard data input device.
FIG. 11 shows the elements displayed on the system operator's screen display.

FIG. 10 presents the system operator's touchscreen or keyboard data input device, which is divided into four clusters of input keys: state two-letter abbreviations, digits, letters, and pre-coded violation keys. The system operator uses the device to input digitized license plate data using the state abbreviations, digits and letters. The state information fills automatically into the two-character space at the left of the license plate entry location. The rest of the license plate (letters and digits) will fill from the right as the operator enters the information so that no empty space is left to the right of the data and so that the system can adapt to license plates that use anywhere from 1 character to 10 characters. The system operator also enters the violation detected using pre-coded keys for simple entry. The violation is spelled out so that part of the resulting still image can be printed and mailed along with the citation. An additional key in the lower right of the operator's touchscreen/keyboard starts, stops, and resets a tracking timer which allows the operator to document the elapsed time a violator was tracked before the operator actually determines that a violation has taken place and certification via still image is initiated. The timer value is included in the composite display 16 data (see FIG. 9).

FIG. 11 shows the information displayed on the system operator's screen display (13 in FIGS. 3 and 4). The display layout is the same in the forward and the rearward units. The operator uses this screen display together with the images from cameras 9, 10, and 18 to determine the sufficiency of the license plate and vehicle images and data prior to triggering the speed detection and still image. Triggering the still image is the certifying event that will cause a citation or warning to be generated and mailed.

Figure 12:
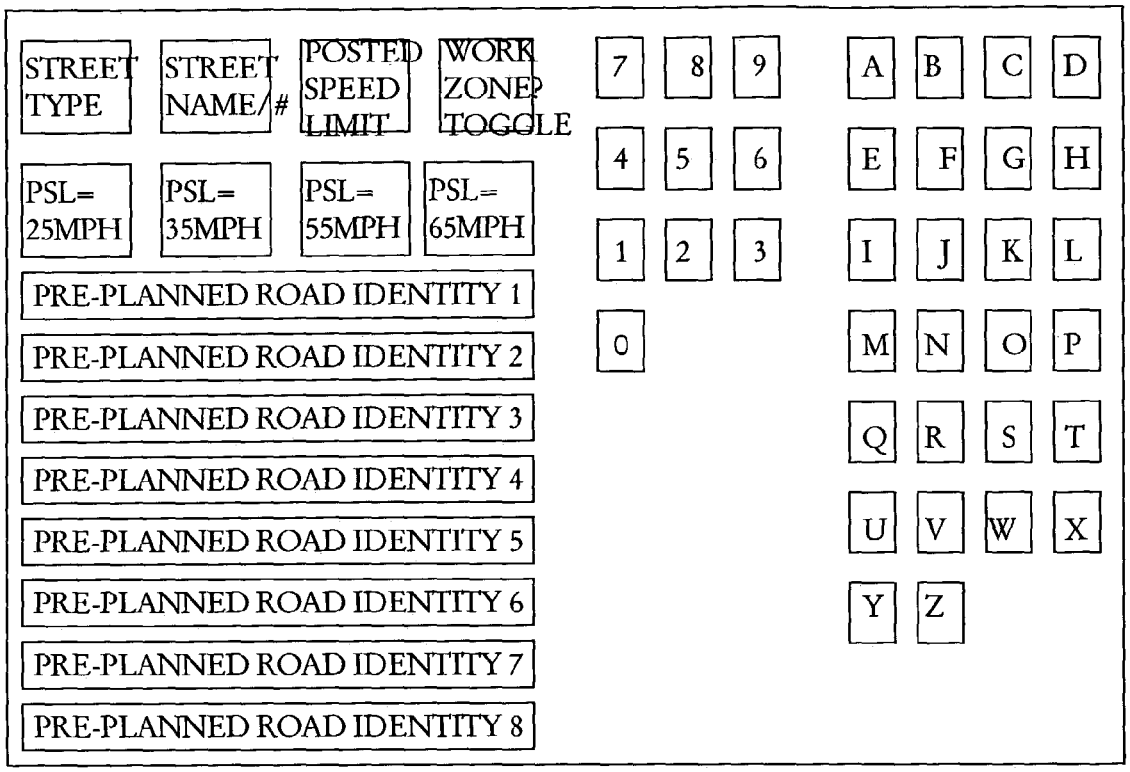
FIG. 12 shows the MEP vehicle driver's touchscreen or keyboard data input device.

FIG. 12 presents the MEP vehicle driver's touchscreen or keyboard data input device. The driver's input must be limited so as not to interfere with the job of driving and with the safety of the vehicle and others in the vicinity. Yet, there are some data which the driver is best situated to enter easily and safely. Pre-coding a number of keys at the beginning of the day or shift or run eliminates the risk of MEP driver distraction. The driver will enter the street or highway identification, the posted speed limit for each respective stretch of road as the vehicle moves along its route, and whether the MEP vehicle is in a work zone or not. As the street or speed limit or work zone status changes, so the driver will change the input to the system. To make the driver's input task safe and simple, anticipated roads to be traveled can be pre-coded as can dominant speed limits so that a single touch enters the desired multi-character entry. For instance, a single touch could cause entry of "I-66" or "George Washington Parkway" or "16th Street, NW" or "MD state route 5" or "7100 Fairfax County Parkway." Likewise, a single touch could enter "55" mph. The work zone key is a toggle "yes" or "no". The MEP driver inputs are networked to the system operator and the composite display 16.

Figure 13:
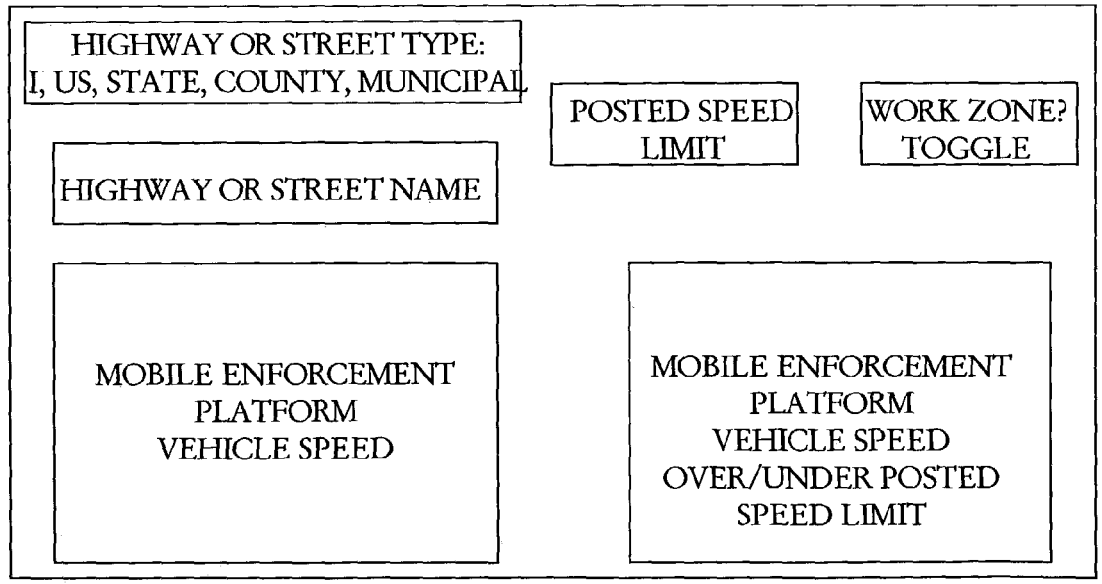
FIG. 13 shows the MEP vehicle driver's screen display elements.

FIG. 13 shows the driver's screen display which together with the input screen (or keyboard) is placed in front of the dashboard to the right of the steering wheel. In this position, the driver can keep track of the active data in the system and the speed of the MEP vehicle in relation to the speed limit and the planned speed. MEP vehicle speed is fed to the personal computer 17, the composite display 16 (see FIG. 9), and the driver's display screen from the MEP vehicle's certified calibrated digital speedometer.

Figure 14:
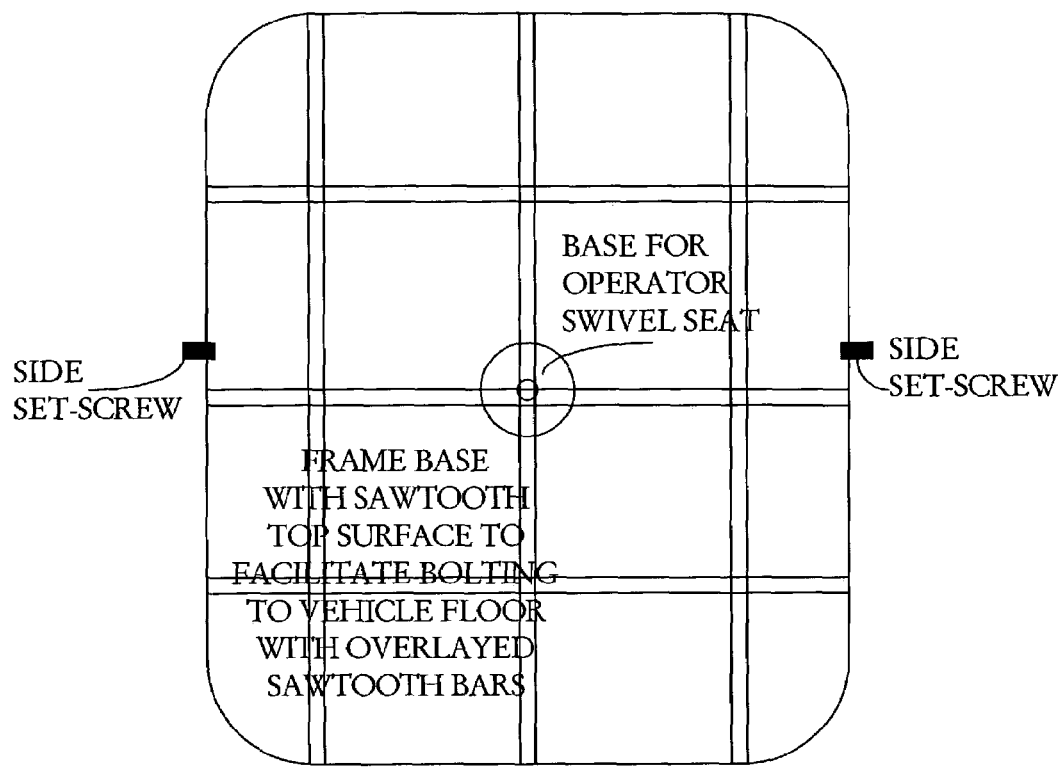
FIG. 14 shows the frame base upon which the MEP equipment assembly and operator work area are installed. The frame with all its assembly is installed and removed as a unit through the rear door of the MEP vehicle.

FIG. 14 illustrates the frame base on which the equipment assembly and integrated operator work area are built and which is installed and removed as a unit through the rear of the vehicle. The base for the operator's seat is in the middle. Set-screws or bolts on each side of the frame help anchor the total assembly, which is fastened to the floor where passenger seats normally would be placed. The frame consists substantially of bars welded together with sawtooth grooves across each of the bars on the side facing up. The grooves make it possible for bars placed over the frame to grip the frame bars (locking teeth) and to be matched with and bolted or fastened to the seat anchors in the floor.

Figure 15:
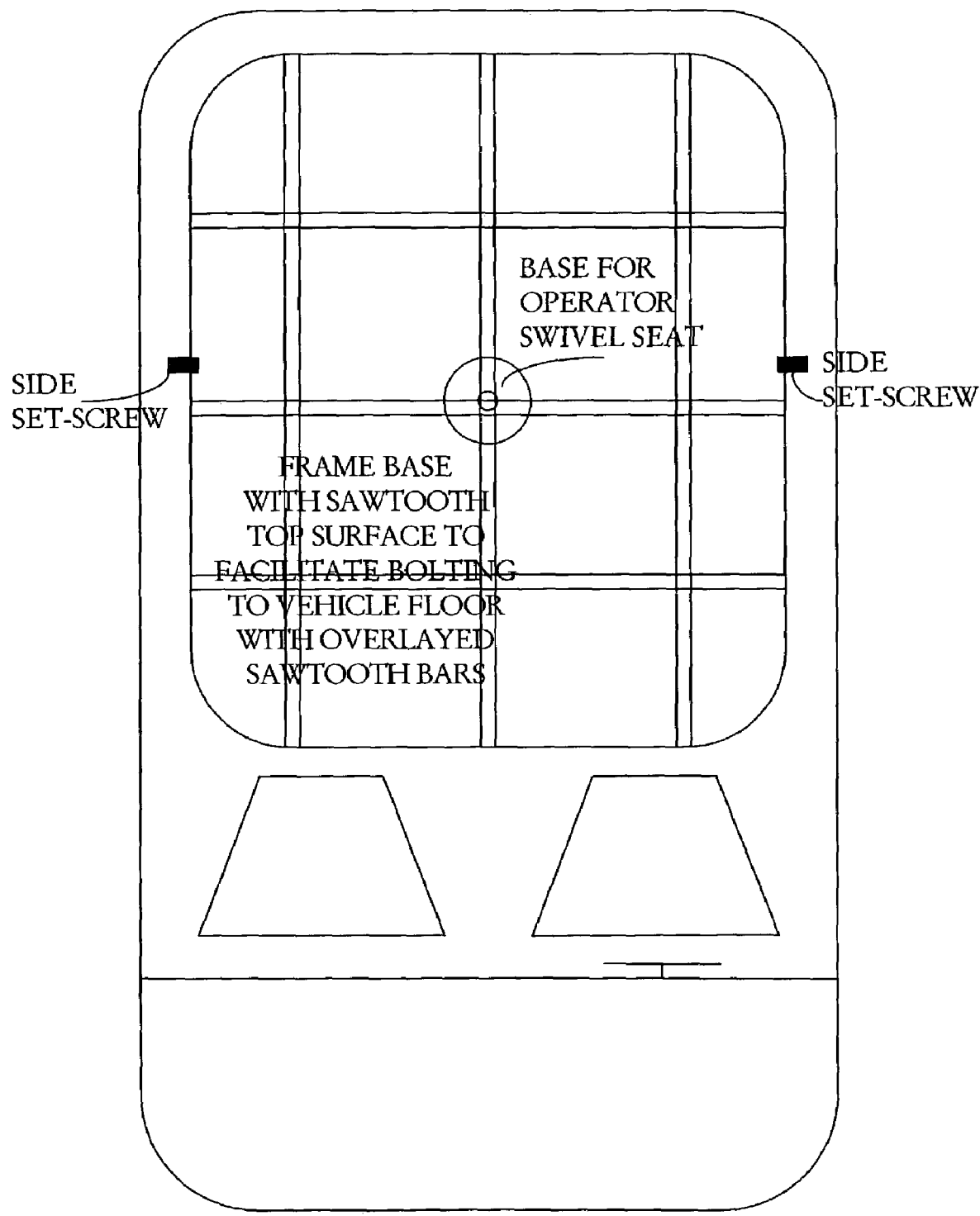
FIG. 15 shows a cut-away view of the frame base in installed position in a generic van-type vehicle.

FIG. 15 shows the generic van-type vehicle with a cut-away view of the frame base in installed position without the additional crossbars bolted to the floor. The frame is sized to the type of vehicle that the jurisdiction wishes to use.

Figure 16:
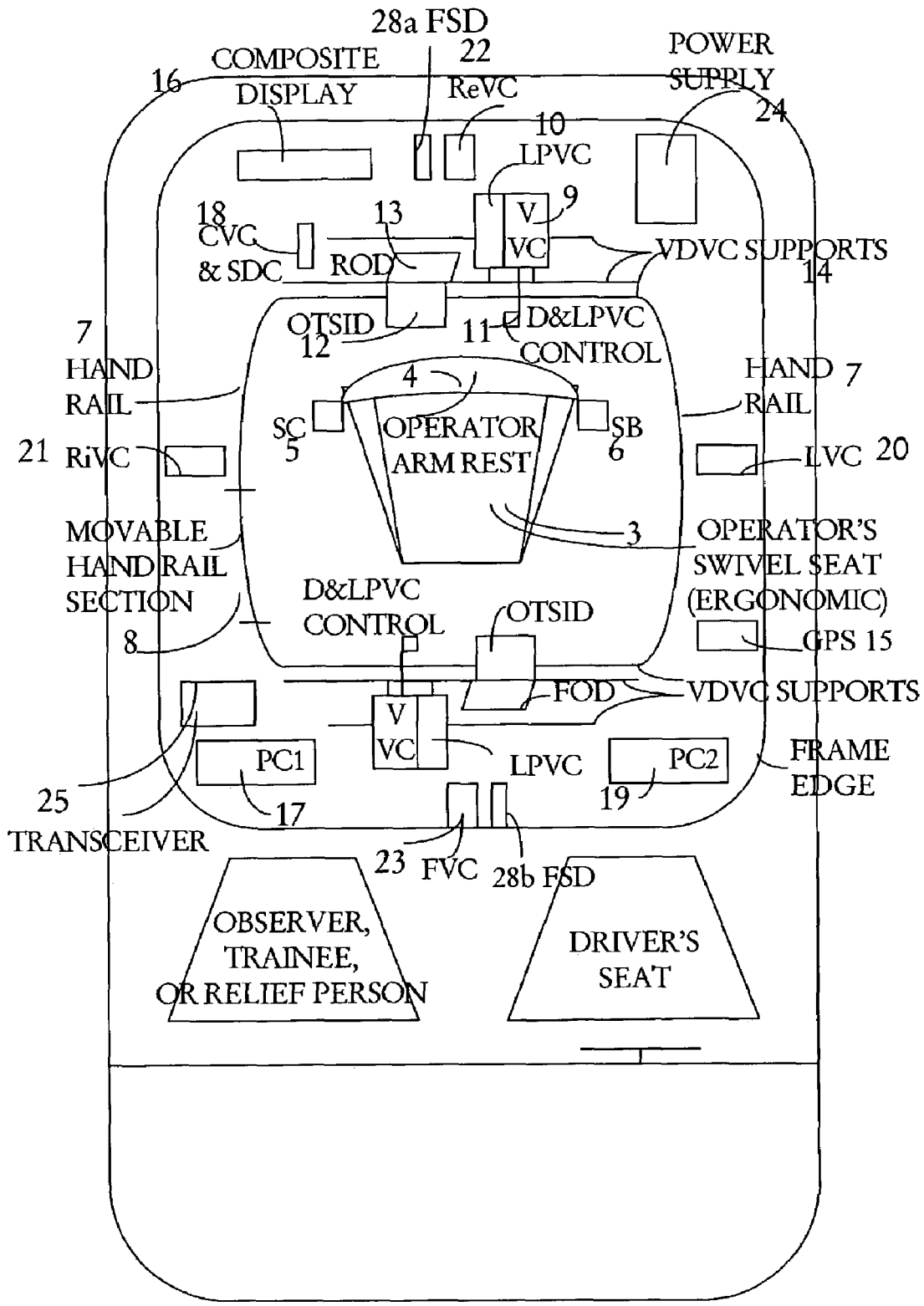
FIG. 16 shows the MEP generic van-type vehicle with the frame-mounted equipment and operator workspace installed in the installed position.

FIG. 16 shows the equipment and integrated work area installed in the back of a van-type vehicle.

What I claim as my invention is:

1. A mobile, aimable, traffic enforcement system with a system operator, together providing multi-lane coverage for monitoring traffic, identifying, detecting and documenting numerous types of violations, storing the documentation in readily retrievable image and data and audio files, transferring the documentation and data to a fixed site facility by radio transmission or by landline or direct link, said system being constructed on a frame and modularly installed and operated in a van-type vehicle (which may be in motion or stopped), and processing and storing said documentation and data at the fixed facility for issuance of violation notification and possible subsequent use as evidence in court proceedings, the system comprising:

detection/imaging systems (D/ISs) with respective support frames and carriages, input and audio devices operated by the system operator(s) and the vehicle driver, computer-based information displays and input touchscreens/keyboards for the operator and driver, global position system receiver, a computer generating additional information and integrating the violation data and imagery with contextual data for composite display of data and video screens, a digital video camera and its output tapes and/or CDs for continuous recording of the composite display and incorporation of operator and driver audio inputs, a still digital image camera (or video camera with still image capability) with high resolution for capture of individual composite displays of each violation, a personal computer with two large hard drives to receive and store said still digital images of violations (speeding) or violators (non-speeding) for use in citation documentation, four contextual digital video cameras, power supply, a MEP vehicle certified calibrated digital speedometer, air circulation means, a central work area and adjustable ergonomic operator's chair, an installable/removable frame, bearing the equipment and workspace, a van-type vehicle with seats removed to accommodate installation of the MEP module on its frame; and more specifically a detection/imaging system (D/IS) of two digital video cameras and a target vehicle speed detection device (e.g., RADAR OR laser LIDAR), all co-mounted and co-aimed on an area seven feet high and seven feet wide at a distance of 50 to 200 feet according to user agency protocols, together generating vehicle speed data and continuous digital images of said vehicle and its license plate;

a hinge and pivot assembly to which said D/IS is attached, facilitating operator-aiming of said D/IS horizontally left and right and vertically up and down from the MEP vehicle central axis drawn fore-to-aft;

an optional, movable D/IS support frame and carriage upon which said D/IS is attached, permitting lateral movement of said D/IS and said support frame and carriage guided by support bars and support track attached to the MEP frame;

an optional foot-brake to lock said support frame and carriage in lateral position on the support bars and track;

a hand-control to activate the zoom on one D/IS video camera, activate the speed detection device, and activate the still digital image camera (triggering the still image of the composite display's complete current contents, certifying the violation and committing the still image documentation to digital memory for later citation processing);

headsets linking system operator and MEP vehicle driver for communication relating to performance of the day's assignments and for audio input of relevant observations concerning violations and traffic data to the continuous video tape;

a MEP operator special input device including pre-programmable keys to expedite accurate data entry and tracking timing;

a MEP vehicle driver's special input device including pre-programmable keys to expedite accurate data entry with minimal distraction;

a MEP vehicle certified calibrated digital speedometer continuously providing the MEP speed data to the MEP system computers, driver and operator displays, and the composite display that is continuously video-recorded and captured in the still image basis for citation;

a MEP operator composite display providing information for performance of violation identification, detection and documentation activities and system management;

a MEP driver special display screen providing information for confirmation by the driver and for MEP vehicle speed management;

a Global Positioning System (GPS) receiver continuously providing location coordinates to a processing personal computer and to a display device in the composite display;

four contextual, high resolution, image-stabilizing, digital video cameras with docking stations for direct feed to video monitors as part of the composite display;

a large memory, very high-speed personal computer for integration of multiple digital signals for composite display;

a composite display of the contextual videos and target vehicle and license plate videos, MEP and target vehicle speed display, GPS coordinates display, and operator/driver data inputs;

a continuous, high resolution, image-stabilizing, digital video camera aimed in a fixed mount at the composite image monitor and configured for output to tape or CD;

a high resolution, still image, digital camera (or high resolution, digital video camera with still image capability) aimed in a fixed mount at the composite image monitor and configured for direct output to a personal computer;

a second very high speed computer with two large, fast hard drives for storing the still digital images and a small monitor displaying the latest still digital image for a predetermined period of time unless superceded by a following violation image, a high speed modem with cabling to permit download over landlines, and output ports for direct link and download to computer(s) at a citation processing site;

a power supply to provide steady, regulated power to the various elements of the system;

a transmitter for transmission of selected still images as well as license plate data to a fixed site;

a work area and surrounding rail;

a light-weight, high-strength frame on which all the equipment and rails are installed surrounding the operator work area, constituting a module, which is installable into and removable from a van-type vehicle in the space vacated by removal of the seats, if any, located behind the driver;

a MEP vehicle (with slightly tinted or one-way-view windows, a vacation or recreational disguise, and a partial curtain behind the driver and passenger seats) and its driver who also provides data inputs;

transceiver(s), computer(s), high-resolution color printers, video players, and tape copiers at a citation processing site supporting the acquisition of the transferred violation images and traffic data for analysis and processing;

a fully-equipped, secure facility to receive, store, process, archive, and analyze evidence with necessary real-time automated links to the vehicle registration data for all states to facilitate immediate citation processing and with appropriate chain-of-custody systems and locking storage cabinets; and an on-line, high-speed computer with a large capacity hard drive on which to store all traffic data for use in traffic analysis and police investigation.

2. The system of claim 1, wherein:

said aimable D/IS video cameras are operated by the system operator to capture and feed license plate, vehicle, and driver images continuously to the composite display;

said aimable (or alternatively fixed) D/IS speed detection device is operated by a trained, authorized system operator (typically a police officer trained in traffic enforcement) to provide detected speed data for successive individual target vehicles (and the MEP vehicle) on demand for output to the composite display;

said integrating computer receiving additional input from the GPS receiver, the system operator's input entry device, the MEP vehicle driver's input entry device, the MEP vehicle's certified calibrated digital speedometer, and the integrating computer's own internally self-generated date and time;

said image and data inputs being displayed via a composite grouping of individual screens and monitors;

said composite display being continuously updated with information from all system elements including multiple D/IS systems which may be active in fixed position as well as dynamic, operator-directed mode;

said composite display being continuously video recorded with incorporation of simultaneous audio track of system operator and MEP driver audio inputs;

said audio inputs being fed directly from an internal audio communications system for incorporation into said continuous video tape or CDs and containing additional violation information and observations;

said composite display being captured in still digital images on command of system operator and automatically transferred to a second high-speed computer;

said second high-speed computer with large capacity hard drive and writeable CD-ROM drive (using writeable, not re-writeable CDs) and modem to support acquisition, storage, and mass transfer of said still images labeled/indexed by date, time, MEP unit identifier, and imaged vehicle identifier if any;

said second computer also acquiring and storing imaged and non-imaged vehicle identifier information directly with no image identifier from system operator;

said still images and vehicle identifier information being transferred by radio transmission from a transceiver to a fixed facility for immediate storage and processing or periodically by modem and landline for storage and processing or by direct link at the end of a shift or run for storage and processing or by internally written CD-ROMs (that are not re-writeable) for later installation, storage, and processing on the fixed facility computer;

said original videotapes or video CDs being serially indexed (using date, time, MEP vehicle identifier, system operator number, and MEP driver number) and transferred with perpetual chain-of-custody for secure storage, and occasional controlled copying;

said video tape or CD copies used to extract non-speeding violation segments for use in processing non-speeding citations; and said citation processing using vehicle registration data for all 50 states acquired for specific violating vehicles.

3. The system of claim 1, wherein the aimable detection/identification system (D/IS) elements are co-mounted and operated to acquire vehicle and violation data and images or alternatively where the speed detection units are co-mounted with the fixed-aim video cameras 22 and 23 and apart from the other aimable identification system elements.

4. The system in claim 1, wherein pre-programmable entry keys for specific highway identifiers, speed limits, work zone information, and specific violations are incorporated on keyboards or touchscreens for accelerated data entry, said keyboards and touchscreens being tailored to user jurisdiction's traffic enforcement applications and traffic information needs.

5. The system in claim 1, wherein a digital video camera captures continuous video images of a composite display of screens data and incorporates additional audio information on the video recording medium for use in citation processing, and wherein a still digital camera (or still image capability within a high-resolution, image-stabilizing video camera) captures images of said composite display and transfers said still images to a high-speed computer for storage and transfer to a fixed facility for citation processing.

* * * * *